Feb. 10, 1931.   W. A. RARIG   1,791,842

POWER DEVICE

Filed Oct. 18, 1928

INVENTOR
Walter A. Rarig
BY

ATTORNEY

Patented Feb. 10, 1931

1,791,842

UNITED STATES PATENT OFFICE

WALTER A. RARIG, OF OAKLAND, CALIFORNIA

POWER DEVICE

Application filed October 18, 1928. Serial No. 313,285.

This invention relates to the adaptation of automobile power plants for purposes other than originally intended. Its principal object is to provide a device for the operation of a wood saw and power pulley directly from the pinion end of an automobile main drive shaft.

It is known that power take-off devices for automobiles have heretofore been provided in which certain types have the disadvantage of requiring numerous connections and parts, some types requiring alterations to the automobile mechanism and other types have the disadvantage of excessively wearing the differential gears in transmitting the motor power to a saw or pulley and are comparatively cumbersome and expensive.

The general object of this invention is to provide a power take-off device for general use which overcomes these objections by providing an extremely simple device for connecting a saw or power pulley to an automobile engine, which is strong, durable and comparatively inexpensive of construction, which is positive, certain and reliable in action, and whereby the engine may be used for sawing wood and for driving machinery such as used for pumping, concrete mixing, hoisting, churning, threshing grains, etc.

A further object of the invention is to provide a portable or stationary sawing device which eliminates the requirement of the conventional saw table, consisting of a saw mandrel, bearings, frame and belt.

In the present invention a saw is attached to the pinion end of an automobile main drive shaft having a bearing adjacent thereto, and a table for resting the material to be sawed is secured to the automobile frame, thereby dispensing with an extra saw machine.

A further object of the invention is to provide collars having key ways for clamping a saw to a shaft in an assembly which will not loosen or tighten by the working action of the saw, thereby preventing a disengagement of the saw from the shaft or the locking of the clamping nut in the event of the saw becoming jammed which may occur with the use of the old style clamping collars not provided with a key.

With these and other objects in view which will appear in the course of the subjoined description, the invention consists of the features of construction, combination and arrangement of parts, hereinafter described and claimed, reference being had to the accompanying drawings, in which:

Figure 1:
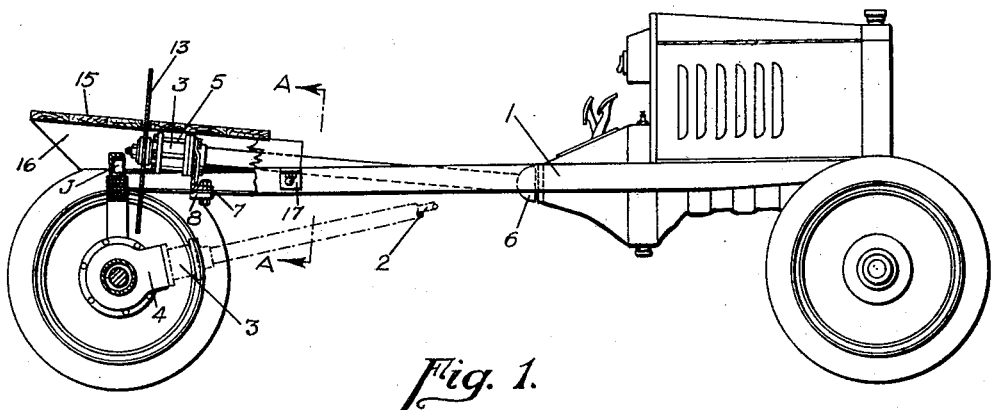
Fig. 1 is a side view of a Ford automobile showing my invention ready for use.

Referring to drawing and figures in Fig. 1, 1 indicates the side frame members of the automobile, 2 the main drive shaft in normal position, and 3 the rear bearing portion of the drive shaft housing which is normally fastened to the main differential housing 4 by means of cap bolts 5. By taking out the cap bolts 5 and removing the drive shaft pinion from the end of the drive shaft, the drive shaft 2 may be swung upward about the universal joint 6 for the application thereto of the present attachment. When it is desired to drive the automobile from place to place the drive shaft 2 may be again placed in its original position. The drawings specifically show the use of the device in connection with a rotary saw and a table for the same. For anchoring the bearing housing 3 in its working position, as shown in solid lines in Fig. 1, an angle bar member 7 is interposed between the side members 1, said bar member of the automobile frame 1 being held in place by bolt clamps 8. The cap bolts 5 taken out at the first operation are replaced in the drive shaft bearing housing so that their heads are nearest the rear shaft end and their threaded ends extend forwardly from said housing to receive nuts. This permits locking one end of each of two braces 9 with the two upper nuts in the bolt circle as at $xx$ in Fig. 2, while the two lower bolts and nuts of said bolt circle are locked to the vertical web of angle bar 7, as at H, and F. The opposite ends of the braces 9 are bolted to the vertical web of the angle bar 7 as at G and H thereby rigidly supporting the housing 3.

Figure 3:
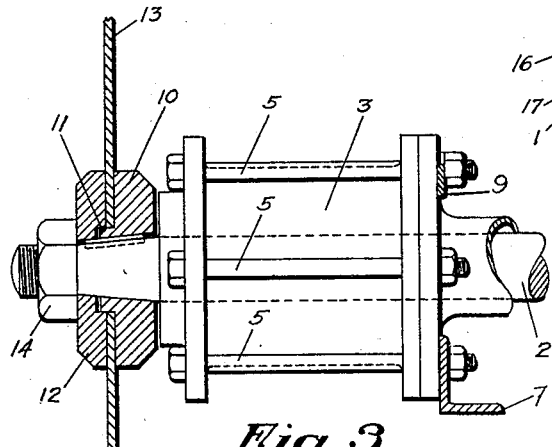
Fig. 3 is an enlarged portion of 3 Fig. 1 showing more clearly the manner in which I accomplish my result.

On the tapered end of the drive shaft 2 is placed a tight-fitting washer or collar 10 with a keyway to receive the key on the shaft, the shoulder 11 fitting into a washer or collar 12 as shown, and a circular saw 13 being put in place between the washers 10 and 12 as shown in Fig. 3. The washer 12 which is also provided with a keyway for the shaft key is then put on the shaft, after which the nut 14 is applied to the threaded shaft end for pressing the washer 10 against the taper of shaft and locking the saw between the washers 10 and 12. This constitutes the mounting of the saw 13 ready for work.

Figure 2:
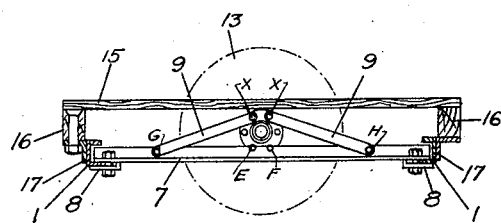
Fig. 2 is a view on line AA of Fig. 1.

The table 15 for the saw is formed of boards, as shown, securely fastened to two stringers 16, said stringers being fastened to the side members 1, as shown in Fig. 2 by means of angle brackets 17 and at point J (Fig. 1).

Figure 4:
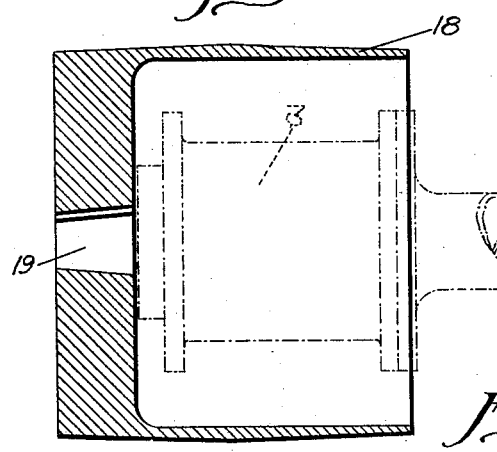
Fig. 4 is a pulley design adaptable for use in driving auxiliary machinery. It is understood that pulley 4 may be of a modified suitable form, for instance, a sheave or sprocket wheel for the transmission of power to auxiliary machinery.

When a pulley 18 (Fig. 4) is to be mounted for use in driving auxiliary machines, washers 10 and 12 are not used. The pulley has an axial taper bore 19 and a keyway, is placed on the taper end of drive shaft 2 and is then locked securely with the nut 14.

From the foregoing description and drawings it will be apparent that I have thus provided an extremely efficient and inexpensive device that converts an automobile into a useful direct driven saw machine and by simply substituting a pulley for the saw an efficient auxiliary power drive is provided.

While I have shown and described the preferred embodiment of my invention, as applied to a Ford automobile, it is of course to be understood that the device may be applied to other automobiles and that I reserve the right to make such changes in the form, construction and arrangement of parts as will not depart from the spirit of the invention or the scope of the subjoined claims.

Having thus described my invention, I claim:

1. In a device of the character described, the combination of a main vehicle drive shaft, a power pulley on the pinion end of said drive shaft, a drive shaft housing and a drive shaft bearing adjacent the pinion end of said housing, and a drive shaft housing supporting member connected to the automobile main frame.

2. The combination of an engine, an automobile main drive shaft, a drive shaft housing providing a bearing adjacent the pinion end of said drive shaft, an automobile frame and a member for supporting said drive shaft housing and bearing from the automobile frame, a power communicating element on the pinion end of said drive shaft for other than vehicle-driving purposes, and means for clamping said element to said drive shaft.

3. In a device of the character described, the combination of a self-propelled vehicle, a main drive shaft extending from a shaft housing, a key and a clamping nut on the extending shaft portion, means for supporting said drive shaft housing from the frame of the vehicle, and clamping collars keyed on the said extending end of said drive shaft.

4. In combination with a chassis of an automobile having the usual power plant and differential, a drive shaft normally connecting the power plant to the differential, bearing means supported by the frame of the chassis and adapted to receive the pinion end of the drive shaft when it is disconnected from the differential, and means adapted to be connected to the pinion end of the drive shaft, in lieu of the pinion, when the drive shaft is disconnected from the differential for the transmission of motion from said drive shaft for other than vehicle driving purposes.

5. In combination with an automobile chassis having the usual frame, power plant and differential, a drive shaft universally connected at one end to the power plant and adapted to be connected at its other end to the differential, supporting means carried by the frame and adapted to receive and support the pinion end of the drive shaft when the same is disconnected from the differential, and a rotary tool adapted to be fitted to the pinion end of the drive shaft in lieu of the pinion thereon for operation by the drive shaft when the same is driven by the power plant.

WALTER A. RARIG.